(12) United States Patent
Vaughan

(10) Patent No.: US 12,005,796 B2
(45) Date of Patent: *Jun. 11, 2024

(54) LIQUID COOLED CHARGING CABLE FOR CHARGING ELECTRIC VEHICLES

(71) Applicant: ChargePoint, Inc., Campbell, CA (US)

(72) Inventor: Peter Vaughan, Los Gatos, CA (US)

(73) Assignee: CHARGEPOINT, INC., Campbell, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 17/346,973

(22) Filed: Jun. 14, 2021

(65) Prior Publication Data

US 2021/0300195 A1 Sep. 30, 2021

Related U.S. Application Data

(63) Continuation of application No. 15/961,610, filed on Apr. 24, 2018, now Pat. No. 11,034,253.

(Continued)

(51) Int. Cl.
*B60L 53/302* (2019.01)
*B60L 1/00* (2006.01)
(Continued)

(52) U.S. Cl.
CPC ............ *B60L 53/302* (2019.02); *B60L 1/003* (2013.01); *B60L 53/14* (2019.02); *B60L 53/18* (2019.02);
(Continued)

(58) Field of Classification Search
CPC ........ B60L 53/30; B60L 53/302; B60L 53/14; B60L 53/18; F28D 2021/0028
(Continued)

(56) References Cited

U.S. PATENT DOCUMENTS

| 5,909,099 A * | 6/1999 | Watanabe ............ A61K 31/728 320/108 |
| 2005/0103033 A1* | 5/2005 | Schwartz ................ F04B 49/20 165/286 |

(Continued)

FOREIGN PATENT DOCUMENTS

| EP | 0584713 A1 * | 3/1994 | ......... F04D 15/0066 |
| EP | 0584713 A1 | 3/1994 | |

(Continued)

OTHER PUBLICATIONS

Final Office Action, U.S. Appl. No. 15/961,610, dated Jan. 30, 2020, 22 pages.

(Continued)

*Primary Examiner* — David V Henze-Gongola
(74) *Attorney, Agent, or Firm* — NICHOLSON DE VOS WEBSTER & ELLIOTT LLP

(57) ABSTRACT

An electric vehicle charging station that uses a liquid cooled charging cable is described. The charging station includes a charging port that is configured to connect to a liquid cooled charging cable. The liquid cooled charging cable includes a cooling loop where a return side of the cooling loop is a warm side. The charging station includes a heat exchanger that transfers heat from the warm side of the cooling loop. The charging station includes a pump to pump a cool side of the liquid through the cooling loop. The charging station includes a module that causes the following to be performed in response to a startup sequence of the electric vehicle charging station: iteratively perform operations of operating the pump at increasing speeds and measuring corresponding pressure output until the speed of the pump is at its normal capacity.

18 Claims, 4 Drawing Sheets

Related U.S. Application Data

(60) Provisional application No. 62/489,432, filed on Apr. 24, 2017.

(51) Int. Cl.
  *B60L 53/14* (2019.01)
  *B60L 53/18* (2019.01)
  *B60L 53/30* (2019.01)
  *B60L 53/66* (2019.01)
  *F28D 1/04* (2006.01)
  *F28D 15/00* (2006.01)
  *F28D 21/00* (2006.01)
  *F28F 27/00* (2006.01)

(52) U.S. Cl.
  CPC ............. *B60L 53/30* (2019.02); *B60L 53/305* (2019.02); *B60L 53/665* (2019.02); *F28D 15/00* (2013.01); *F28D 1/04* (2013.01); *F28D 2021/0028* (2013.01); *F28F 27/00* (2013.01); *F28F 2250/08* (2013.01)

(58) Field of Classification Search
  USPC ...................................................... 174/8–29
  See application file for complete search history.

(56) References Cited

U.S. PATENT DOCUMENTS

| | | | |
|---|---|---|---|
| 2013/0267115 A1 | 10/2013 | Mark | |
| 2015/0217654 A1* | 8/2015 | Woo | ......................... B60L 53/16 320/109 |
| 2015/0308731 A1* | 10/2015 | Viklund | .................. F25D 21/08 29/890.03 |
| 2017/0297431 A1* | 10/2017 | Epstein | ................... F02N 19/10 |

FOREIGN PATENT DOCUMENTS

| | | |
|---|---|---|
| KR | 10-2016-0119147 A | 10/2016 |
| WO | 2016/054068 A1 | 4/2016 |

OTHER PUBLICATIONS

Final Office Action, U.S. Appl. No. 15/961,610, dated Oct. 27, 2020, 22 pages.
International Preliminary Report on Patentability, PCT App. No. PCT/US2018/029181, dated Nov. 7, 2019, 11 pages.
International Search Report and Written Opinion for Application No. PCT/US2018/029181, dated Jul. 31, 2018, 14 pages.
Non-Final Office Action, U.S. Appl. No. 15/961,610, dated May 12, 2020, 27 pages.
Notice of Allowance, U.S. Appl. No. 15/961,610, dated Feb. 16, 2021, 9 pages.

* cited by examiner

US 12,005,796 B2

LIQUID COOLED CHARGING CABLE FOR CHARGING ELECTRIC VEHICLES

CROSS-REFERENCE TO RELATED APPLICATIONS

This application is a continuation of U.S. application Ser. No. 15/961,610, filed Apr. 24, 2018, which claims the benefit of U.S. Provisional Application No. 62/489,432, filed Apr. 24, 2017, which is hereby incorporated by reference.

FIELD

Embodiments of the invention relate to the field of electric vehicle charging; and more specifically, to a cooled cable for charging electric vehicles.

BACKGROUND

Electric vehicle charging stations, sometimes referred to as EVSE, are used to charge electric vehicles (e.g., electric battery powered vehicles, gasoline/electric battery powered vehicle hybrid, etc.). Electric vehicle charging stations may be in designated charging locations (e.g., like locations of gas stations), adjacent to parking spaces (e.g., public parking spaces and/or private parking spaces), etc. Electric vehicle charging stations may be in geographic locations where it can get very cold.

SUMMARY

An electric vehicle charging station that uses a liquid cooled charging cable is described. The charging station includes a charging port that is configured to connect to a liquid cooled charging cable. The liquid cooled charging cable includes a cooling loop where a return side of the cooling loop is a warm side. The charging station includes a heat exchanger that transfers heat from the warm side of the cooling loop. The charging station includes a pump to pump a cool side of the liquid through the cooling loop. The charging station includes a module that causes the following to be performed in response to a startup sequence of the electric vehicle charging station: iteratively perform operations of operating the pump at increasing speeds and measuring corresponding pressure output until the speed of the pump is at its normal capacity.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

A method and apparatus for recovering from a cold start of an electric vehicle charging station with a liquid cooled charging cable is described. Upon a cold start of an electric vehicle charging station that has a liquid cooled charging cable, a set of one or more steps (sometimes referred to herein as the startup sequence) is performed to determine if it is safe to operate the electric vehicle charging station including allowing an electric vehicle to charge using that electric vehicle charging station. During periods of extreme cold, the liquid in the liquid cooled charging cable may itself freeze or become viscous. During such situations, if the liquid is pumped in its regular operating capacity, the pressure may rise and components in the system may fail (such as the cooling radiator or anywhere along the cooling loop). In an embodiment, the set of one or steps includes monitoring the current of the dispenser and/or monitoring a pressure sensor or flow sensor. For instance, upon a cold start, the pump may be operated at low speed and the pressure may be measured. If the pressure is below a predetermined threshold, the speed of the pump may be increased and the pressure again be measured. These steps can be done iteratively until it is determined that the speed of the pump may be operated at its normal capacity.

Figure 1:
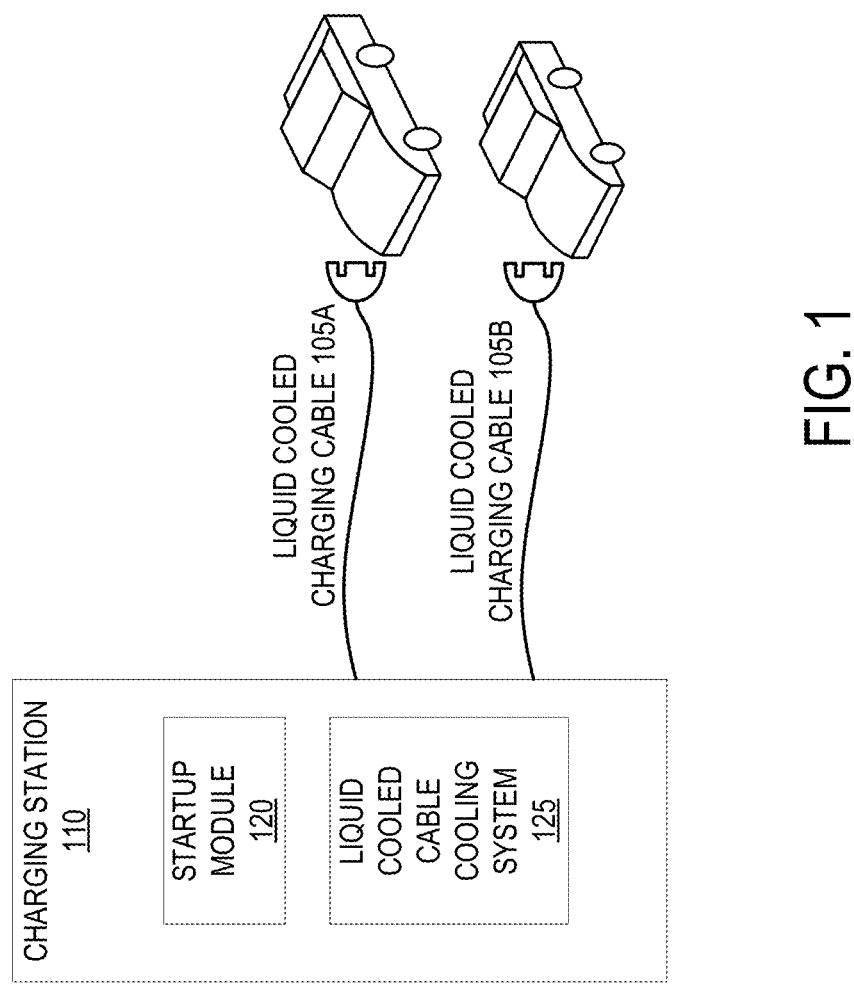
FIG. 1 is a block diagram that illustrates an exemplary system for a liquid cooled charging cable to charge electric vehicles, according to an embodiment.

FIG. 1 is a block diagram that illustrates an exemplary system for a liquid cooled charging cable to charge electric vehicles, according to an embodiment. The system includes an electric vehicle charging station 110 that charges electric vehicles. The electric vehicle charging station 110 includes two charging ports for charging two electric vehicles. The charging ports may support a wired connection for attached charging cords (e.g., with a connector conforming to SAE Electric Vehicle and Plug in Hybrid Electric Vehicle Conductive Charge Coupler (J1772_201602), February 2016 ("SAE J 1772"); a connector conforming to the CHAdeMO protocol) for charging electric vehicles, connector capable of connecting to Tesla Motors™ vehicles, a GB connector, and/or any other connector that attaches to an electric vehicle).

The cables for carrying the current for charging the electric vehicles are liquid cooled charging cables 105A and 105B. The liquid within the liquid cooled charging cables may be an antifreeze.

The electric vehicle charging station 110 includes the liquid cooled cable cooling system 125 that handles the regulation of the temperature of the liquid for the liquid cooled charging cables 105A-105B. An exemplary implementation of the liquid cooled cable cooling system 125 will be described with respect to FIG. 2. The liquid cooled cable cooling system 125 includes the liquid within the liquid cooled charging cables 105A-105B.

The electric vehicle charging station 110 also includes the startup module 120 that performs a startup sequence to determine whether it is safe to operate the electric vehicle charging station. For instance, the startup module 120 may monitor the current flowing through the liquid cooled charging cables 105A and/or 105B, and/or monitor a pressure or flow sensor of the liquid of the liquid cooled charging cables 105A and/or 105B. The startup module 120 may cause a pump of the liquid cooled cable cooling system 125 to be operated at low speed upon a cold start and the corresponding pressure be measured. If the pressure is below a predetermined threshold, the startup module 120 may cause the speed of the pump to increase and the pressure to be measured again and compared to the threshold. These steps can be performed iteratively until it is determined that the speed of the pump can be operated at its normal capacity.

Figure 2:
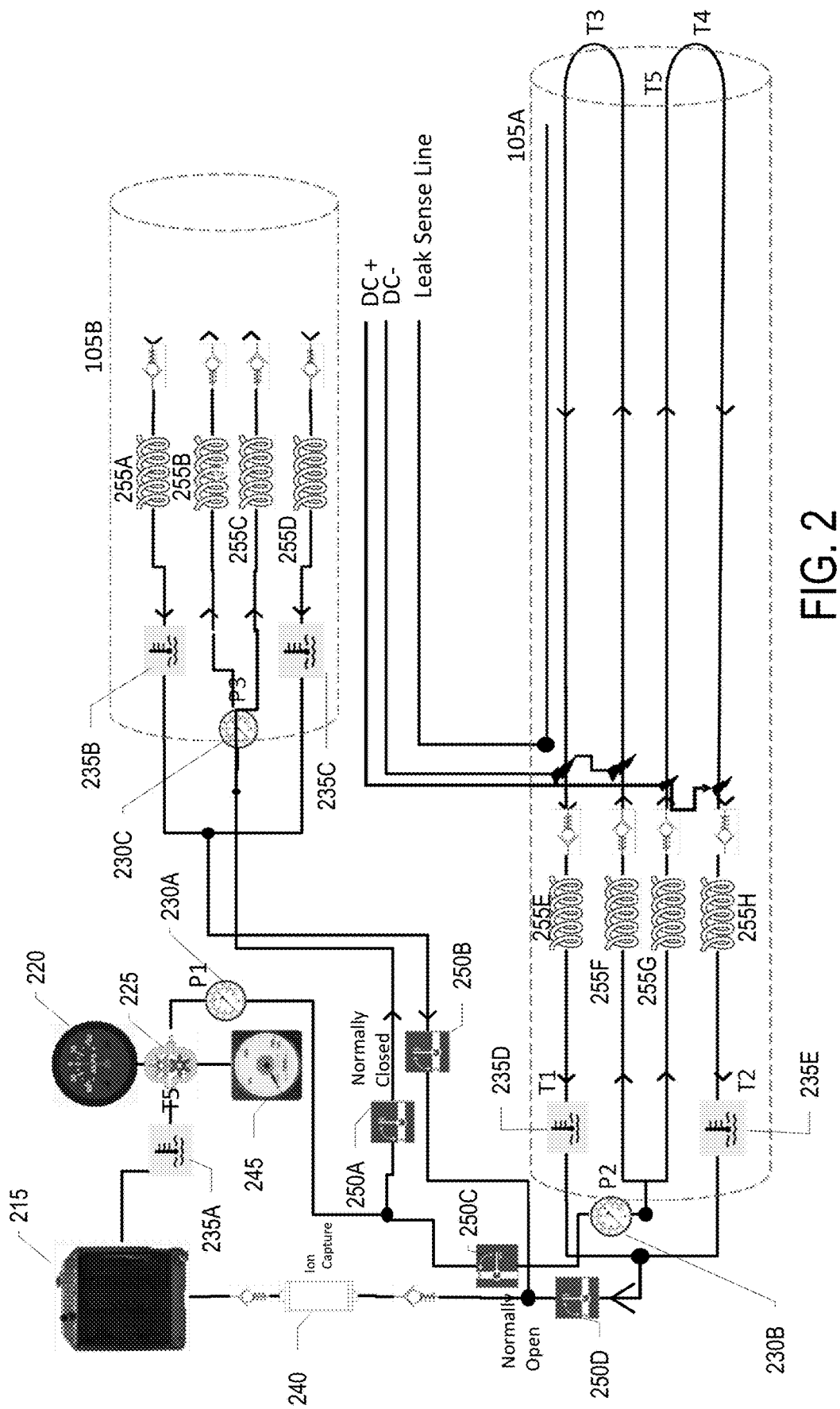
FIG. 2 is a block diagram that illustrates an exemplary system for recovering from a cold start of an electric vehicle charging station with a liquid cable according to an embodiment.

FIG. 2 is a block diagram that illustrates an exemplary system for recovering from a cold start of an electric vehicle charging station with a liquid cable according to an embodiment. The components illustrated in FIG. 2 are part of an electric vehicle charging station that includes two liquid cooled charging cables 105A-105B. It should be understood, however, that implementations may have one liquid cooled charging cable or more than two liquid cooled charging cables. The system 200 includes the heat exchanger 215 that transfers heat of the liquid of the liquid cooled charging cables. The warm side of the liquid passes through the heat exchanger 215, and the heat exchanger 215 absorbs some of the heat from the warm side of the liquid. The heat exchanger 215 may be a radiator. Alternatively, or additionally to the heat exchanger 215, the system 200 may include a chiller that cools the liquid of the liquid cooled charging cables 105A-105B.

The temperature sensor 235A measures the temperature of the cool side of the liquid as output by the heat exchanger 215. The pump 225 pumps the cool side of the liquid throughout the system. In an embodiment, the pump 225 is a positive displacement pump. The DC current meter 220 measures the DC current used by the pump 225. The current used by the pump 225 can be used as an analog to the pressure within the liquid cooled cable cooling system 125.

The tachometer 245 measures the rotation speed of the pump 225. The pressure sensor 230A measures the output pressure of the pump 225. The cool side of the liquid is controlled by the on-off valve 250A and the on-off valve 250C. When the valve 250A is opened, the cool side of the liquid flows to the liquid cooled charging cable 105B. When the valve 250C is open, the cool side of the liquid flows to the liquid cooled charging cable 105A.

The liquid cooled charging cable 105A and the liquid cooled charging cable 105B each include a cooling loop for the positive side of the electrical connection and the negative side of the electrical connection. For example, as illustrated in FIG. 2, the liquid cooled charging cable 105A includes a cooling loop for the DC positive side of the electrical connection and a cooling loop for the DC negative side of the electrical connection.

The liquid cooled charging cable 105A includes the isolation tubing loops 255F-255G for the cooled side of the liquid, and the isolation tubing loops 255E and 255H for the warm side of the liquid. The pressure sensor 230B measures the output pressure of the cool side of the liquid that is flowing through the liquid cooled charging cable 105A. On the warm side of the liquid (returning toward the heat exchanger 215), the temperature sensor 235D and the temperature sensor 235E measures the temperature of the liquid being returned from the liquid cooled charging cable 105A. The on-off valve 250D allows the warm side of the liquid to flow back toward the heat exchanger 215. The warm side of the liquid returning to the heat exchanger 215 includes an ion capture cartridge 240 to capture ions in the liquid flowing back to the heat exchanger 215.

The liquid cooled charging cable 105B includes the isolation tubing loops 255B-255C for the cooled side of the liquid, and the isolation tubing loops 255A and 255D for the warm side of the liquid. The pressure sensor 230C measures the pressure of the cool side of the liquid that is flowing through the liquid cooled charging cable 105B. On the warm side of the liquid (returning to the heat exchanger 215), the temperature sensor 235B and 235C measure the temperature of the liquid being returning from the liquid cooled charging cable 105B. The on-off valve 250B allows the warm side of the liquid to flow back toward the heat exchanger 215.

Figure 3:
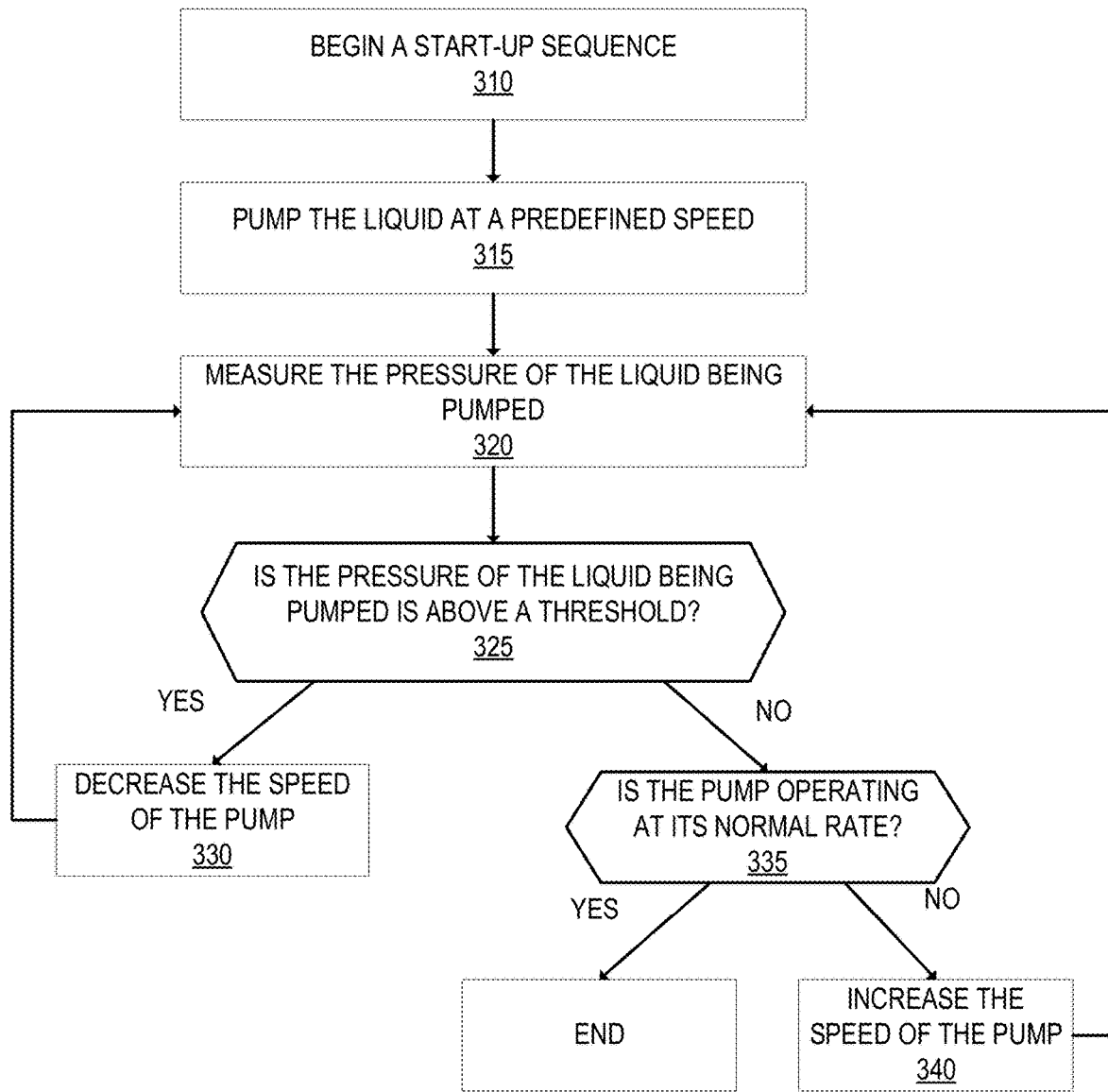
FIG. 3 illustrates exemplary operations that are performed by an electric vehicle charging station having a liquid cooled charging cable according to an embodiment.

FIG. 3 illustrates exemplary operations that are performed by an electric vehicle charging station having a liquid cooled charging cable according to an embodiment. The operations of FIG. 3 will be described with respect to the exemplary embodiment of FIGS. 1 and 2. However, the operations of FIG. 3 can be performed by different embodiments than those of FIGS. 1 and 2, and the embodiments of FIGS. 1 and 2 can perform operations different than those of FIG. 3.

At operation 310, the electric vehicle charging station 110 begins a start-up sequence. The start-up sequence may be initiated responsive to a cold start of the electric vehicle charging station. The start-up sequence may be performed to determine whether the electric vehicle charging station can be operated safely. For instance, during periods of extreme cold, the liquid in the liquid cooled charging cables 105A or 105B may freeze or become viscous. If the liquid is pumped in its regular operating capacity during such a period, the pressure may rise and components in the system may fail (such as the heat exchanger or anywhere along the cooling loop).

Next, at operation 315, the electric vehicle charging station 110 starts pumping the liquid at a predefined speed. For instance, regarding FIG. 2, the pump 225 starts pumping the liquid for the liquid cooled charging cable 105A and/or 105B. The predefined speed is selected with the expectation that it will be low enough to prevent damage to the components to the system, such as the heat exchanger 215.

Next, at operation 320, the electric vehicle charging station 110 measures the pressure of the liquid being pumped. For instance, regarding FIG. 2, the pressure sensor 230A, pressure sensor 230B, and/or pressure sensor 230C measure the pressure of the liquid being pumped. If multiple pressure sensors are measuring the pressure of the liquid being pumped, there may be multiple different pressure readings because the liquid may have different viscosity in different parts of the system.

Next, at operation 325, the electric vehicle charging station 110 determines whether the pressure of the liquid being pumped is above a predefined threshold. The predefined threshold is relative to the speed at which the pump is being operated. A high pressure (such as above the predefined threshold) indicates that the liquid may not be flowing as expected. A low pressure (such as below the predefined threshold) indicates that the liquid is flowing as expected. If there are multiple pressure sensors (such as shown in FIG. 2), the electric vehicle charging station 110 determines whether the pressure of the liquid being pumped is above the predefined threshold for each of the pressure sensors. If the pressure is above the predefined threshold (or in cases where there are multiple sensors, any of the pressure readings indicates pressure above the predefined threshold), then flow moves to operation 330. If the pressure is below the predefined threshold, then flow moves to operation 335.

At operation 330 (the pressure was determined to be above the predefined threshold), the electric vehicle charging station 120 decreases the speed of the pump, and operation goes back to operation 320.

At operation 335 (the pressure was determined to be below the predefined threshold), the electric vehicle charging station 110 determines whether the pump is being operated at its normal rate. The electric vehicle charging station 110 may determine this through examination of the speed of the pump 225 (e.g., through the reading provided by the tachometer 245) and/or through the energy consumption of the pump 225 (e.g., through the reading provided by the DC current meter 220). If the pump is operating at its normal rate, then operations end and it assumed that the charging station can operate in its normal capacity. If the pump is operating below its normal rate, then at operation 340, the electric vehicle charging station 110 increases the speed of the pump to another predefined speed, and operation goes back to operation 320. The operations 320-340 may be done iteratively until the speed of the pump may be operated at its normal capacity.

In an embodiment, to warm the liquid when not in use, current is passed through the liquid cooled charging cables thereby creating warmth. For example, the electric vehicle charging station may short an electrical connection at a holder of the connector of the liquid cooled charging cable (when the connector is connected to the station) to pass current through the liquid cooled charging cable.

In an embodiment, in addition to or in lieu of passing current through the liquid cooled charging cables, the electric vehicle charging station may include a heater in which the liquid is passed through to warm the liquid.

Figure 4:
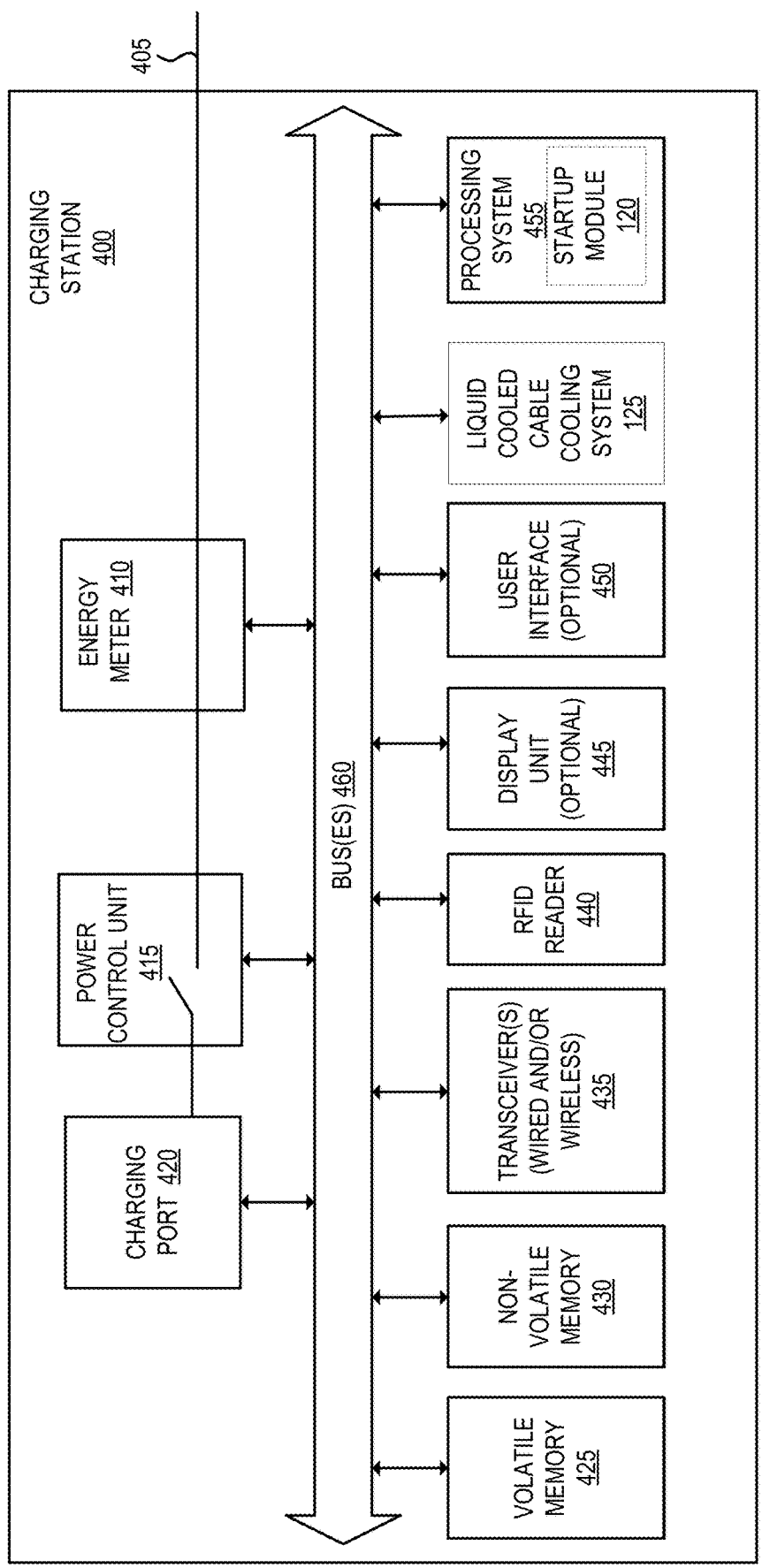
FIG. 4 illustrates an exemplary embodiment of a charging station according to one embodiment of the invention.

FIG. 4 illustrates an exemplary embodiment of a charging station according to one embodiment of the invention. It should be understood that FIG. 4 illustrates an exemplary architecture of a charging station, and other, different architectures may be used in embodiments of the invention described herein. For example, one or more of the components illustrated in FIG. 4 may not be included in some embodiments. The charging station 110 may take the form of the charging station 400.

As illustrated in FIG. 4, the charging station 400 includes the energy meter 410, the power control unit 415, the charging port 420, the volatile memory 425, the non-volatile memory 430 (e.g., hard drive, flash, PCM, etc.), one or more transceiver(s) 435 (e.g., wired transceiver(s) such as Ethernet, power line communication (PLC), etc., and/or wireless transceiver(s) such as 802.15.4 transceivers (e.g., ZigBee, etc.), Bluetooth, WiFi, Infrared, GPRS/GSM, CDMA, etc.), the RFID reader 440, the display unit 445, the user interface 450, the liquid cooled cable cooling system 125, and the processing system 455 (e.g., one or more microprocessors and/or a system on an integrated circuit), which are coupled with one or more buses 460.

The energy meter 410 measures the amount of electricity that is flowing on the power line 405 through the charging connection 420. While in one embodiment of the invention the energy meter 410 measures current flow, in an alternative embodiment of the invention the energy meter 410 measures power draw. The energy meter 410 may be an induction coil or other devices suitable for measuring electricity. In cases where there are multiple charging ports, the energy meter 410 may measure the current flow and/or power draw separately for each distinct charging port.

The RFID reader 440 reads RFID tags from RFID enabled devices (e.g., smartcards, key fobs, contactless credit cards, Near Field Communications in phones or tablets, etc.), embedded with RFID tag(s) of operators that want to use the charging station 400. For example, in some embodiments a vehicle operator can wave/swipe an RFID enabled device near the RFID reader 430 to request a charging session with the charging station 400. It should be understood, however, that charging sessions may be requested in different ways and access identifiers may be presented to the charging station in different ways. For example, in some embodiments the electric vehicles communicate an access identifier (e.g., their VIN) to the charging station through a protocol (e.g., PLC). In such embodiments, the electric vehicle operator may not be required to present an access identifier (such as the RFID enabled device) to gain access to the charging station.

The transceiver(s) 435 transmit and receive messages. For example, the transceiver(s) 435 transmit authorization requests to the service, receive authorization replies from the service, transmit charging session data to the service, etc.

The display unit 445 (which is optional) is used to display messages to vehicle operators including the price(s) for charging service, current cost for charging service, charging status, confirmation messages, error messages, notification messages, etc. The display unit 445 may also display parking information if the charging station 400 is also acting as a parking meter (e.g., amount of time remaining in minutes, parking violation, etc.).

The user interface 440 (which is optional) allows users to interact with the charging station 400. By way of example, the user interface 450 allows electric vehicle operators to request charging sessions, pay for charging sessions, enter in account and/or payment information, etc.

The processing system 455 may retrieve instruction(s) from the volatile memory 425 and/or the nonvolatile memory 430, and execute the instructions to perform operations as described above. For instance, the processing system 455 may execute instructions performed by the startup module 120.

The techniques shown in the figures can be implemented using code and data stored and executed on one or more electronic devices (e.g., a charging station). Such electronic devices store and communicate (internally and/or with other electronic devices over a network) code and data using machine-readable media, such as non-transitory machine-readable storage media (e.g., magnetic disks; optical disks; random access memory; read only memory; flash memory devices; phase-change memory) and transitory machine-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An electric vehicle charging station, comprising:
   a charging port that is configured to connect to a liquid cooled charging cable, wherein the liquid cooled charging cable includes a cooling loop for regulating temperature of an electrical connection of the liquid cooled charging cable, wherein a return side of the cooling loop is a warm side, and wherein the cooling loop loops a liquid within the liquid cooled charging cable;
   a heat exchanger that is configured to transfer heat from the liquid from the warm side of the cooling loop;
   a pump to pump a cool side of the liquid through a cool side of the cooling loop;
   a DC current meter that is configured to measure a DC current used by the pump; and
   a processor configured to execute instructions to cause the following to be performed in response to a startup sequence of the electric vehicle charging station:
      iteratively perform operations of operating the pump at increasing speeds and determining a corresponding pressure output based on the measured DC current until the speed of the pump is at its normal capacity with a determined pressure output below a pressure threshold,
   wherein the processor is further configured to execute instructions to cause current to pass through the liquid cooled charging cable to warm liquid of the liquid cooled charging cable when the electric vehicle charging station is not in use and a connector of the liquid cooled charging cable is connected to the electric vehicle charging station.

2. The electric vehicle charging station of claim 1, wherein the processor is further configured to execute instructions to cause the following to be performed in response to the startup sequence of the electric vehicle charging station:
   examine the current used by the pump to determine whether the pump is operating at its normal capacity.

3. The electric vehicle charging station of claim 1, wherein the liquid cooled charging cable includes a first cooling loop for a DC positive side of the electrical connection and a second cooling loop for a DC negative side of the electrical connection.

4. The electric vehicle charging station of claim 1, further comprising:
   a chiller that is configured to cool liquid of the liquid cooled charging cable.

5. The electric vehicle charging station of claim 1, wherein the heat exchanger is a radiator.

6. The electric vehicle charging station of claim 1, wherein the instructions to cause current to pass through the liquid cooled charging cable causes an electrical connection at a holder of the connector to be shorted.

7. A method in an electric vehicle charging station, comprising:
   causing current to pass through a liquid cooled charging cable to warm liquid of the liquid cooled charging cable when the electric vehicle charging station is not in use and a connector of the liquid cooled charging cable is connected to the electric vehicle charging station;
   initiating operation of a pump of the electric vehicle charging station at a first speed in response to a startup sequence, wherein the pump is pumping the liquid of the liquid cooled charging cable through a cooling loop to regulate temperature of an electrical connection of the liquid cooled charging cable, and wherein the first speed is lower than a speed of the pump operating at its normal speed;
   measuring pressure of the liquid being pumped by the pump operating at the first speed;
   determining whether the measured pressure exceeds a threshold based on a measured DC current used by the pump; and
   responsive to determining that the measured pressure does not exceed the threshold, proceeding in an iterative manner of operating the pump at a second speed and measuring pressure of the pump operating at the second speed for a next iteration, until the measured pressure of the pump is at its normal capacity.

8. The method of claim 7, further comprising:
   passing liquid of the liquid cooled charging cable through a heater to warm the liquid when the electric vehicle charging station is not in use.

9. The method of claim 7, wherein operating the pump of the electric vehicle charging station at the first speed is performed responsive to a cold start of the electric vehicle charging station.

10. The method of claim 7, wherein measuring pressure of the liquid being pumped by the pump operating at the first speed includes reading a plurality of pressure readings from a plurality of pressure sensors respectively.

11. The method of claim 10, wherein determining whether the measured pressure exceeds the threshold includes determining whether each of the plurality of pressure readings individually exceeds the threshold.

12. The method of claim 7, wherein the current passing through the liquid cooled charging cable causes an electrical connection at a holder of the connector to be shorted.

13. An electric vehicle charging station, comprising:
   a processor; and
   a non-transitory machine-readable storage medium that provides instructions that, when executed by the processor, cause the electric vehicle charging station to:
      cause current to pass through a liquid cooled charging cable to warm liquid of the liquid cooled charging cable when the electric vehicle charging station is not in use and a connector of the liquid cooled charging cable is connected to the electric vehicle charging station;
      initiate operation of a pump of the electric vehicle charging station at a first speed in response to a startup sequence, wherein the pump is to pump the liquid of the liquid cooled charging cable through a cooling loop to regulate temperature of an electrical connection of the liquid cooled charging cable, and wherein the first speed is lower than a speed of the pump operating at its normal speed;

measure pressure of the liquid being pumped by the pump operating at the first speed;

determine whether the measured pressure exceeds a threshold based on a measured DC current used by the pump; and responsive to a determination that the measured pressure does not exceed the threshold, proceed in an iterative manner of operating the pump at a second speed and measure pressure of the pump operating at the second speed for a next iteration, until the measured pressure of the pump is at its normal capacity.

14. The electric vehicle charging station of claim 13, wherein the instructions, when executed, further cause the electric vehicle charging station to:

cause liquid of the liquid cooled charging cable to be passed through a heater to warm the liquid when the electric vehicle charging station is not in use.

15. The electric vehicle charging station of claim 13, wherein operation of the pump of the electric vehicle charging station at the first speed is to be performed responsive to a cold start of the electric vehicle charging station.

16. The electric vehicle charging station of claim 13, wherein the measurement of pressure of the liquid being pumped by the pump operating at the first speed includes a reading of a plurality of pressure readings from a plurality of pressure sensors respectively.

17. The electric vehicle charging station of claim 16, wherein to determine whether the measured pressure exceeds the threshold includes a determination of whether each of the plurality of pressure readings individually exceeds the threshold.

18. The electric vehicle charging station of claim 13, wherein the instructions to cause current to pass through the liquid cooled charging cable causes an electrical connection at a holder of the connector to be shorted.

* * * * *